United States Patent [19]

Kosaka

[11] Patent Number: 5,847,847
[45] Date of Patent: Dec. 8, 1998

[54] IMAGE PROCESSING APPARATUS AND METHOD

[75] Inventor: Masahiko Kosaka, Kawasaki, Japan

[73] Assignee: Cabib Kabushiki Kaisha, Tokyo, Japan

[21] Appl. No.: 427,168

[22] Filed: Apr. 24, 1995

[30] Foreign Application Priority Data

Apr. 28, 1994 [JP] Japan .................................. 6-092492

[51] Int. Cl.[6] .............................. H04N 1/46; G03F 3/08
[52] U.S. Cl. ........................ 358/508; 358/523; 358/539
[58] Field of Search .................................. 358/500, 539, 358/508, 515, 520, 523, 524, 527, 537, 445, 518, 426, 261.2, 261.3, 427, 449; 348/392, 424; 382/167

[56] References Cited

U.S. PATENT DOCUMENTS

| | | | |
|---|---|---|---|
| 4,772,955 | 9/1988 | Kurahayashi et al. | 358/426 |
| 4,796,092 | 1/1989 | Ogata | 358/261.1 |
| 4,814,890 | 3/1989 | Kato | 358/443 |
| 4,845,569 | 7/1989 | Kurahayashi et al. | 358/400 |
| 4,862,250 | 8/1989 | Takei | 358/524 |
| 4,974,071 | 11/1990 | Maeda | 358/539 |
| 5,067,027 | 11/1991 | Yano | 358/455 |
| 5,153,749 | 10/1992 | Katayama | 358/445 |
| 5,218,457 | 6/1993 | Burkhardt et al. | 358/465 |
| 5,251,020 | 10/1993 | Sugiyama | 358/500 |
| 5,267,153 | 11/1993 | Shimura et al. | 358/500 |
| 5,274,469 | 12/1993 | Small et al. | 358/445 |
| 5,305,116 | 4/1994 | Kagami | 358/445 |
| 5,327,264 | 7/1994 | Iyama | 358/515 |
| 5,361,143 | 11/1994 | Nakayama et al. | 358/500 |
| 5,363,206 | 11/1994 | Fukushima | 358/440 |
| 5,363,219 | 11/1994 | Yoshida | 358/539 |
| 5,386,300 | 1/1995 | Kitawaki | 358/539 |
| 5,392,133 | 2/1995 | Nakajima | 358/500 |
| 5,438,436 | 8/1995 | Harris | 358/524 |
| 5,440,404 | 8/1995 | Okamoto | 358/426 |
| 5,477,345 | 12/1995 | Tse | 358/500 |
| 5,479,263 | 12/1995 | Jacob | 358/539 |

FOREIGN PATENT DOCUMENTS

| | | | |
|---|---|---|---|
| 0580375A1 | 1/1994 | European Pat. Off. | H04N 1/32 |
| 0581590A2 | 2/1994 | European Pat. Off. | G06F 3/033 |
| 4181862 | 6/1992 | Japan | H04N 1/00 |
| 4307893 | 10/1992 | Japan | H04N 11/00 |
| 2256558 | 12/1992 | United Kingdom | H04N 1/32 |
| 2275386 | 8/1994 | United Kingdom | H04N 1/46 |

*Primary Examiner*—Edward L. Coles
*Assistant Examiner*—Cheukfan Lee
*Attorney, Agent, or Firm*—Fitzpatrick, Cella, Harper & Scinto

[57] ABSTRACT

In a color facsimile apparatus on a transmission side, color image information is encoded and stored in accordance with a parameter which optimizes the picture quality. A parameter regarding the picture quality of the color image information which a color facsimile apparatus on a reception side has is recognized and compared with the parameter of the color facsimile apparatus on the transmission side. In accordance with the comparison result, an image conversion of the stored color image information is executed.

23 Claims, 13 Drawing Sheets

FIG. 4

| | FOR Y | | | | | | | | FOR UV | | | | | | |
|---|---|---|---|---|---|---|---|---|---|---|---|---|---|---|---|
| 16 | 11 | 10 | 16 | 24 | 40 | 51 | 61 | 17 | 18 | 24 | 47 | 99 | 99 | 99 | 99 |
| 12 | 12 | 14 | 19 | 26 | 58 | 60 | 55 | 18 | 21 | 26 | 66 | 99 | 99 | 99 | 99 |
| 14 | 13 | 16 | 24 | 40 | 57 | 69 | 56 | 24 | 26 | 56 | 99 | 99 | 99 | 99 | 99 |
| 14 | 17 | 22 | 29 | 51 | 87 | 80 | 62 | 47 | 66 | 99 | 99 | 99 | 99 | 99 | 99 |
| 18 | 22 | 37 | 56 | 68 | 109 | 103 | 77 | 99 | 99 | 99 | 99 | 99 | 99 | 99 | 99 |
| 24 | 35 | 55 | 64 | 81 | 104 | 113 | 92 | 99 | 99 | 99 | 99 | 99 | 99 | 99 | 99 |
| 49 | 64 | 78 | 87 | 103 | 121 | 120 | 101 | 99 | 99 | 99 | 99 | 99 | 99 | 99 | 99 |
| 72 | 92 | 95 | 98 | 112 | 100 | 103 | 99 | 99 | 99 | 99 | 99 | 99 | 99 | 99 | 99 |

F11

F12

F13

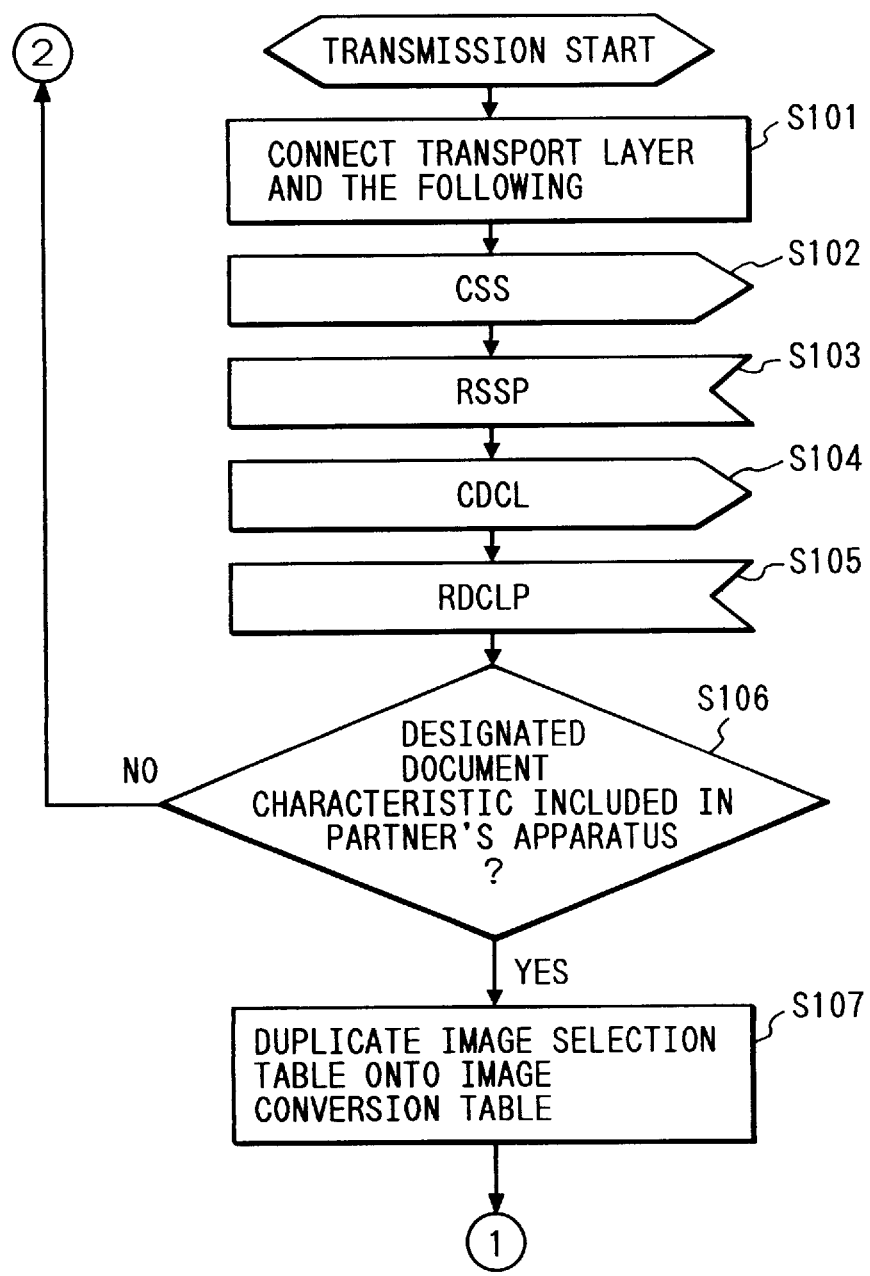

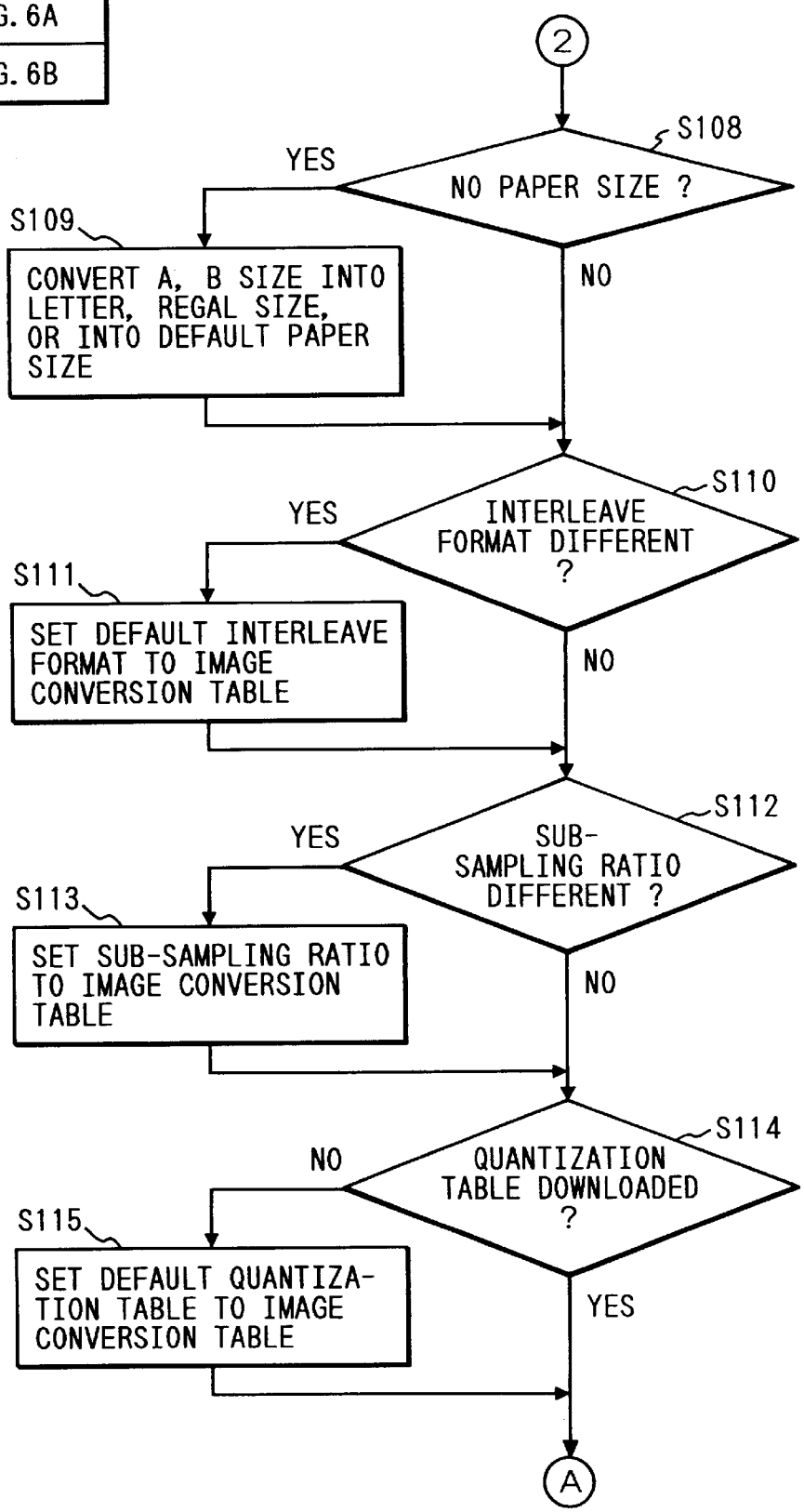

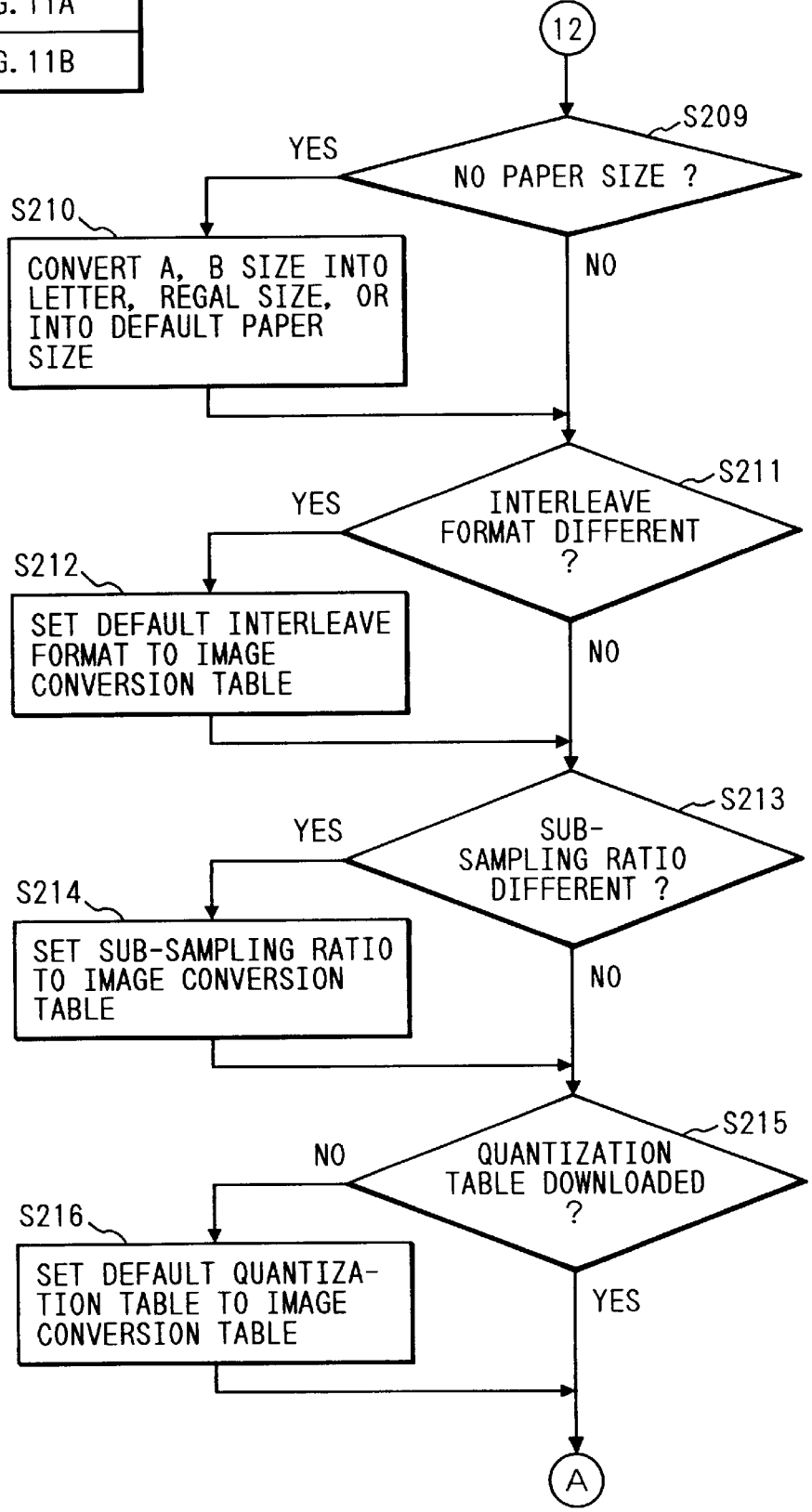

IMAGE PROCESSING APPARATUS AND METHOD

BACKGROUND OF THE INVENTION

1. Field of the Invention

The invention relates to an image processing apparatus and method which performs a color image communication.

2. Related Background Art

Hitherto, in a color facsimile apparatus which performs a color image communication, in a case of using a preset resolution and paper size and, further, a JPEG encoding, a document is encoded and stored in accordance with a sub-sampling ratio, a quantization table, a color space, an interleave format, and parameters of a Huffman table and is transmitted.

However, in the case of the above conventional color facsimile apparatus, since the reception side doesn't have the ability to reproduce a good quality picture, vain image data is transmitted to the reception side or an image transmission is executed in which a reproducing ability on the reception side is not most effectively used.

SUMMARY OF THE INVENTION

It is an object of the invention to provide a color image processing apparatus in which the transmission side doesn't have characteristics which are matched with characteristics of a document stored on the reception side and, even in the case of image converting and transmitting the document, a deterioration of the image due to such an image conversion is minimized.

To accomplish the above object, according to a preferred embodiment of the invention, there is provided a color image processing apparatus which communicates color image information, wherein the apparatus comprises: storing means for storing the color image information; generating means for generating a parameter regarding a picture quality of the color image information which an apparatus on the reception side has; processing means for performing an image process of the color image information stored in the storing means in accordance with the parameter generated by the generating means; and transmitting means for transmitting the color image information which was image processed by the processing means.

Another object of the invention is to provide a color image processing apparatus in which in the case where the reception side doesn't have any parameter regarding a luminance and a chromaticity used when the transmission side encodes, an image deterioration which occurs by an image conversion according to a reception side ability that is executed on the transmission side is minimized.

Still another object of the invention is to provide a color image processing apparatus in which in the case where the reception side doesn't have any parameter regarding a quantization table used when the transmission side encodes, an image deterioration which occurs by an image conversion according to a reception side ability that is executed on the transmission side is minimized.

Further another object of the invention is that data which is once encoded by a sub-sampling ratio of a luminance and a chromaticity is converted to data encoded by a proper sub-sampling ratio.

To accomplish the above objects, according to a preferred embodiment of the invention, there is provided an image processing apparatus comprising: encoding means for encoding image information by a first sub-sampling ratio of a luminance and a chromaticity; and converting means for converting the image information encoded by the encoding means to image information encoded by a second sub-sampling ratio different from the first sub-sampling ratio.

Further another object of the invention is that data which is once quantized by using a quantization parameter is converted to data quantized by a proper quantization parameter.

To accomplish the above object, according to a preferred embodiment of the invention, there is provided an image processing apparatus comprising: encoding means for quantizing and encoding image information by a first quantization parameter; and converting means for converting the image information encoded by the encoding means to image information which is quantized and encoded by a second quantization parameter different from the first quantization parameter.

The above and other objects and features of the present invention will become apparent from the following detailed description and the appended claims with reference to the accompanying drawings.

BRIEF DESCRIPTION OF THE DRAWINGS

FIG. 4 is a diagram showing a quantization table according to the embodiment;

FIG. 5 is a flowchart showing a transmission sequence of a storing document in the facsimile apparatus according to the embodiment;

DETAILED DESCRIPTION OF THE PREFERRED EMBODIMENTS

A preferred embodiment according to the present invention is described in detail hereinbelow with reference to the drawings.

Figure 1:
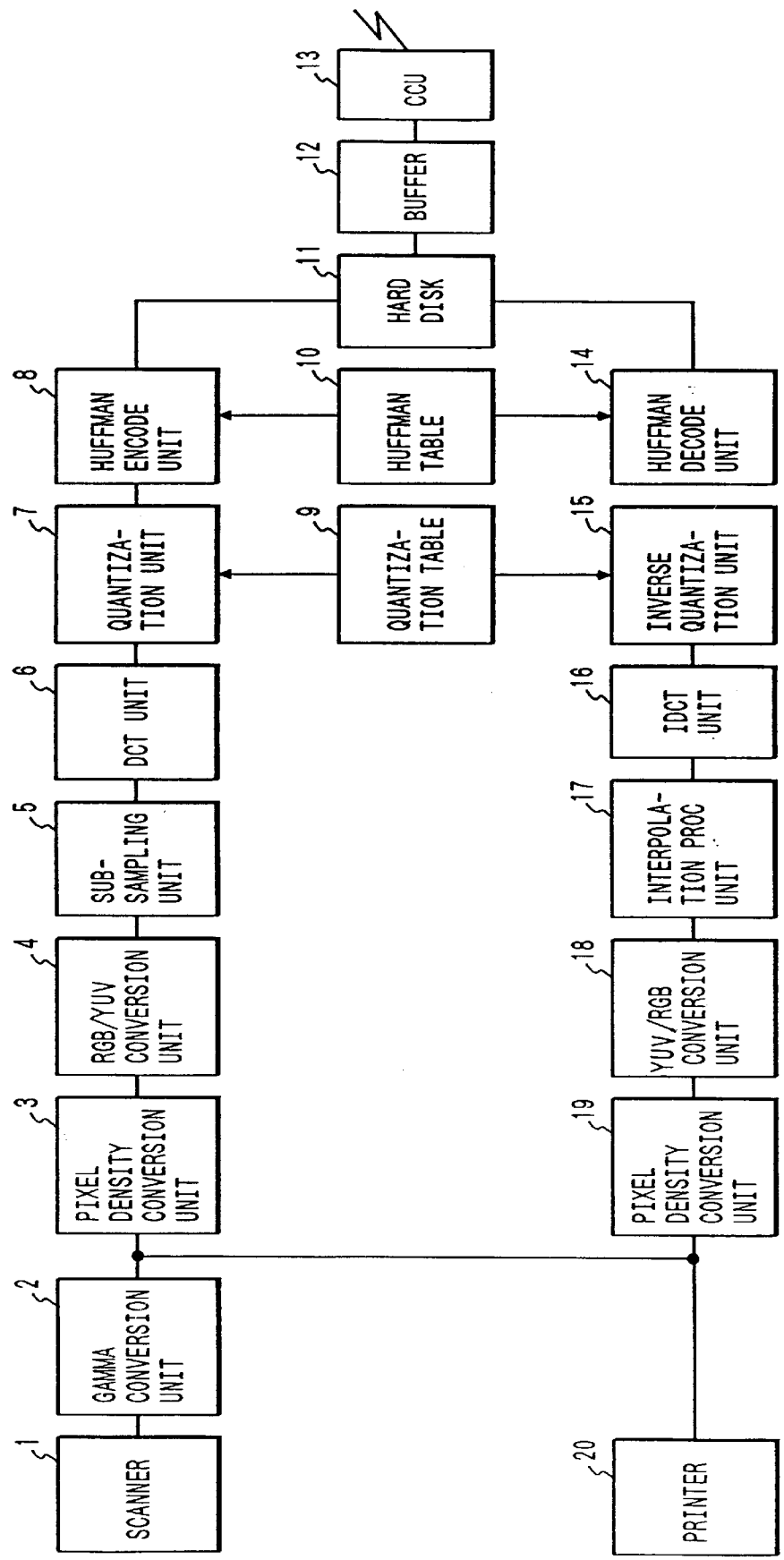
FIG. 1 is a block diagram showing a construction of a color facsimile apparatus according to an embodiment of the invention.

FIG. 1 is a block diagram showing a construction of a color facsimile apparatus (hereinafter, simply referred to as a facsimile apparatus) according to the embodiment of the invention. The facsimile apparatus according to the embodiment is connected to an ISDN (Integrated services digital network).

In FIG. 1, reference numeral 1 denotes a scanner which functions as a device to read a color original; 2 a gamma conversion unit for converting a density characteristic of image data read by the scanner 1; and 3 a pixel density conversion unit for performing a resolution conversion of the image, a zooming process, or the like.

Reference numeral 4 denotes an RGB/YUV conversion unit for converting an RGB image read by the scanner 1 to a YUV image that is optimum to an ADCT (adaptive discrete cosine transform). Reference numeral 5 denotes a sub-sampling unit which is a circuit to drop resolutions of U and V components which are not visually sensitive while keeping a resolution of a Y component that is visually sensitive. Reference numeral 6 denotes a DCT (discrete cosine transform) unit for converting block components of (8×8) pixels to (8×8) frequency components.

Reference numeral 7 denotes a quantization unit for quantizing (dividing) an arithmetic operation result of the DCT by a table designated from among a plurality of quantization tables. Reference numeral 8 denotes a Huffman encode unit. As a result of the quantization in the quantization unit 7, since many results of 0 excluding a DC component and a low frequency component are obtained, a Huffman encoding is performed by using the number of continuous 0 values.

Reference numeral 9 denotes a lookup table for quantization which is used in the quantization unit 7 and an inverse quantization unit 15. In the embodiment, as a quantization table that is used at the time of an inverse quantization upon reception, a quantization table of the same table number as that of the table used in the quantization on the transmission side is downloaded from the quantization table 9 and is used.

Reference numeral 10 denotes a lookup table which is used in the Huffman encode unit 8 and a Huffman decode unit 14. In the embodiment, as a table which is used at the time of a Huffman decoding upon reception, the same table as the table used in the Huffman encoding on the transmission side is downloaded from the Huffman table and is used.

Reference numeral 11 denotes a hard disk to store a storing document and a reception document and 12 indicates a buffer for transmitting and receiving image data between a CCU (communication control unit) 13 and the hard disk 11 at an optimum speed. The CCU 13 controls call generation and reception to/from a terminal on the reception side and transmission and reception of image data by using a predetermined communication protocol.

The Huffman decode unit 14 decodes the Huffman encoded data. The inverse quantization unit 15 inversely quantizes the quantized data by using the foregoing quantization table. Reference numeral 16 denotes an inverse DCT (inverse discrete cosine transform) unit for converting the (8×8) frequency components which were DCT converted by the DCT unit 6 to the data of (8×8) pixel blocks.

Reference numeral 17 denotes an interpolation processing unit. In the case where resolutions of the U and V components are reduced as compared with a resolution of the Y component by a sub-sampling process at the time of the storage of the document, the interpolation processing unit 17 interpolates such a reduced resolution. Reference numeral 18 denotes a YUV/RGB conversion unit for converting the image data of YUV to a color space of RGB; 19 a pixel density conversion unit for performing a resolution conversion, a zooming process, or the like of an image; and 20 a printer which outputs the color image data at a high resolution of 400 dpi.

Figure 2:
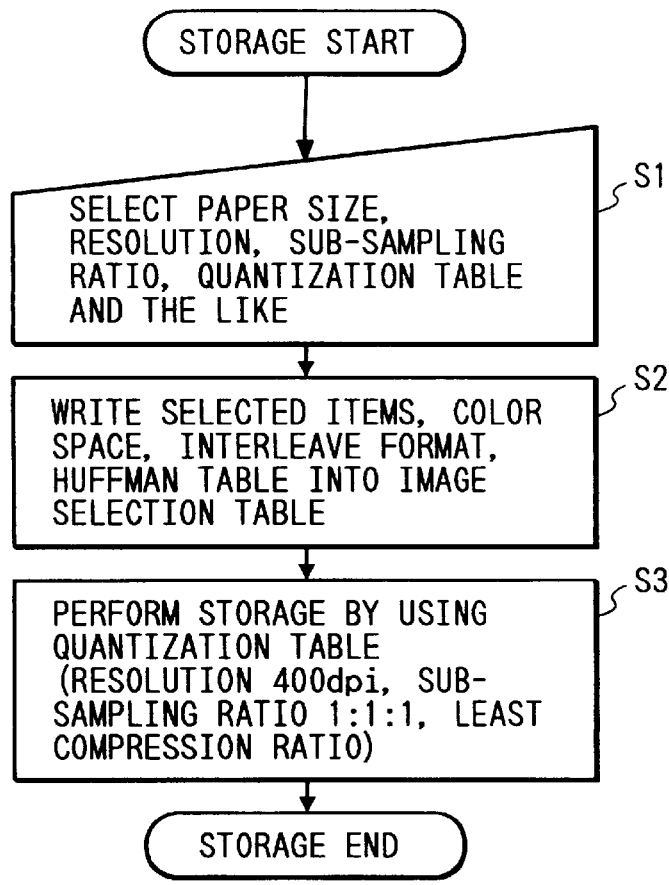
FIG. 2 is a flowchart showing a storing processing sequence of a transmission document in the facsimile apparatus according to the embodiment.

FIG. 2 is a flowchart showing a processing sequence when the facsimile apparatus of the embodiment actually stores a transmission document.

First in step S1 in FIG. 2, the user selects a paper size, a resolution, a sub-sampling ratio between a luminance component and a chromaticity component, a quantization table, and the like by a console unit of the facsimile apparatus. (In the embodiment, the sub-sampling ratio denotes a ratio between a sampling frequency of the luminance component and a sampling frequency of two chromaticity components.) In step S2, the items selected in step S1 and, further, a color space, an interleave format, and a Huffman table specified specifically in the system are written into an image selection table shown in FIG. 3. In step S3, they are stored by using a quantization table of parameters such that a color image which has been preset in the facsimile apparatus of the embodiment is stored at a high picture quality, in the embodiment, the parameters such that the preset color image is stored in high detail, namely, a resolution of 400 dpi, a sub-sampling ratio of 1:1:1, and a low compression ratio. Namely, those items are quantized by a quantization table of a lowest compression ratio by using a sub-sampling ratio such that the resolution is highest and the best color is derived and are stored.

Figure 3:
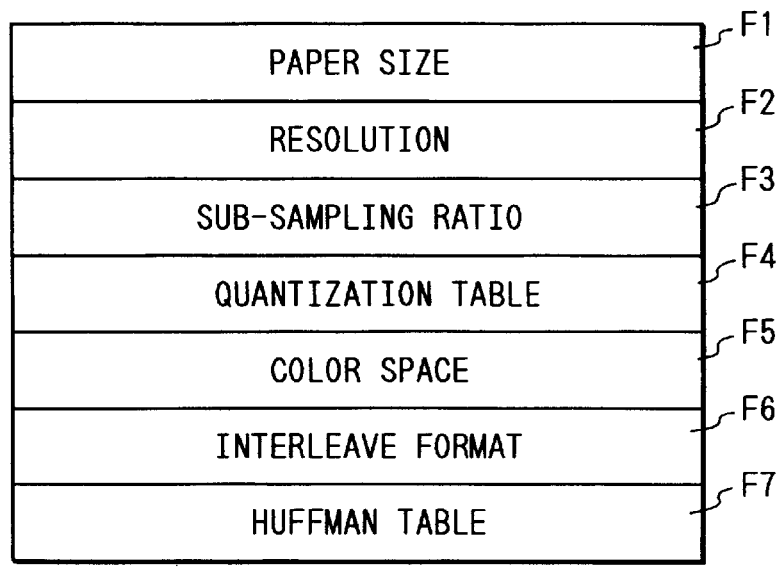
FIG. 3 is a diagram showing an image selection table according to the embodiment.

FIG. 3 shows the image selection table set in step S2 in FIG. 2. A parameter of the paper size selected from the paper sizes of B5, B4, A4, and A3 held in the facsimile apparatus is set in F1 in FIG. 3. A parameter of the resolution selected from the resolutions of 400 dpi, 300 dpi, and 200 dpi held in the facsimile apparatus is set in F2.

A parameter selected from the sub-sampling ratios of (1:1:1), (2:1:1), and (4:1:1) held in the facsimile apparatus is set in F3. Further, a table number selected from quantization tables shown in FIG. 4 and a type indicating whether the selected table is default or not are set in F4, respectively.

Values of YUV set so as to be used in the system among parameters allocated to each of color spaces YUV, RGB, La*b* held in the facsimile apparatus are set in F5. Block-sequential values set so as to be used in the system among parameters allocated to each of a block-sequence and block-area-sequence of the interleave formats held in the facsimile apparatus are set in F6. A type of table selected from Huffman tables held in the facsimile apparatus and a type indicating whether the selected Huffman table is default or not are set in F7, respectively.

FIG. 4 shows quantization tables of the embodiment. The parameters of the quantization table to be set in F4 in FIG. 3 are stored in such quantization tables.

In the embodiment, values such that image data is compressed at high picture qualities in accordance with the order from F11, F12, and F13 are set in the quantization tables shown in FIG. 4 (compression ratios deteriorate in accordance with this order). Namely, values of matrices decrease in accordance with the order of F11, F12, and F13. F11 relates to a default quantization table and the other tables are unique to the facsimile apparatus.

Figure 6B:
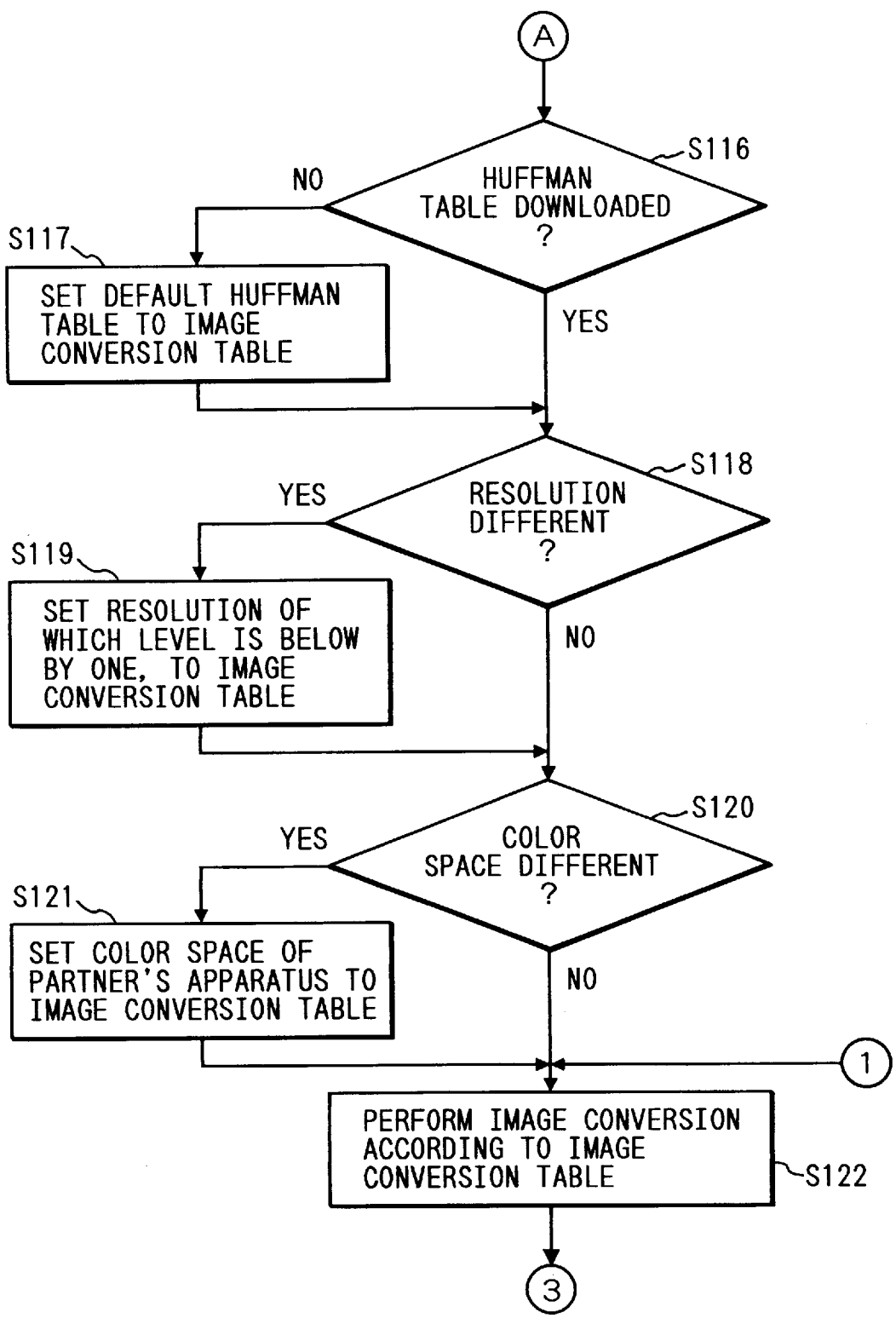
FIG. 6 is comprised of FIG. 6A and FIG. 6B showing flowcharts illustrating a transmission sequence of a storing document in the facsimile apparatus according to the embodiment.
Figure 7:
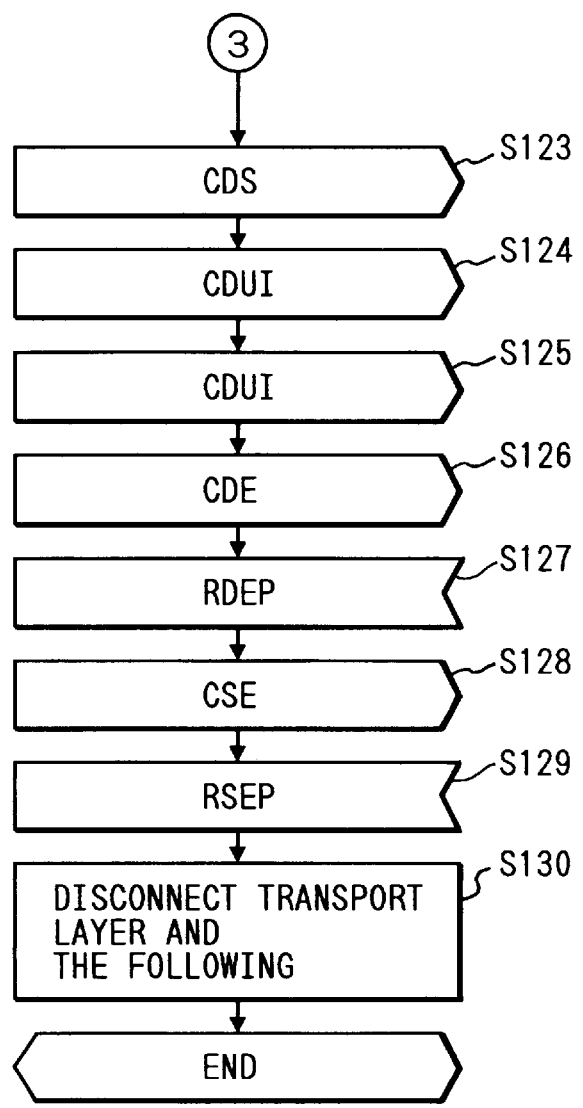
FIG. 7 is a flowchart showing a transmission sequence of a storing document in the facsimile apparatus according to the embodiment.

FIGS. 5 to 7 are flowcharts showing a transmission sequence of a storing document in the facsimile apparatus of the embodiment.

In step S101 in FIG. 5, the facsimile apparatus connects a transport layer and the following. That is, layers from 2 to 4 of an OSI reference protocol are connected by the CCU 13 in FIG. 1. Processes in step S2 and subsequent steps, which will be described hereinlater, conform with a practical application example of a communication protocol defined by the recommendation T.62 of ITU-T (International Telecommunication Union—Telecommunication recommendation).

In step S102, a command of session start (hereinafter, abbreviated to as CSS) is generated to the reception side. In step S103, when a response of session start positive (hereinafter, abbreviated to as RSSP) from the reception side is received, document characteristics (a paper size, an interleave format, a sub-sampling ratio, whether or not the quantization table is default, a type indicating whether or not the table is downloaded to a partner's apparatus, whether or not the Huffman table is default, a type indicating whether or not the table is downloaded to the partner's apparatus, an image transfer density, a color space) which is set in the own terminal are transmitted to the reception side by document program file attributes which are described in session user data (hereinafter, abbreviated to SUD) of a command of document function list (hereinafter, abbreviated to CDCL) in step S104.

In step S105, judging processes in the following steps S106 to S112 are performed by the SUD in a response of document function list positive (hereinafter, abbreviated to RDCLP) sent from the reception side.

Namely, in step S106, the AND of document characteristics in the above image selection table and document characteristics sent from the reception side is calculated. Thus, if it is "true" with respect to all of the document characteristics, the processing routine advances to step S107. If there is a "false" in any one of the documents, the processing routine advances to step S108 (FIG. 6A).

In step S107, the image selection table is copied as is in an image conversion table. In step S108, a check is made to see whether or not the reception side can use the paper size designated on the transmission side. When the designated paper size cannot be used, step S109 follows. When the designated paper size can be used, the processing routine advances to step S110.

In step S109, first, when the designated paper size can be changed to a paper size such as letter size, legal size, or the like that is relatively close to the paper size of the A or B series, the designated paper size is converted to such a size. However, when such a size conversion is impossible, the A4 size as a default paper size is set into the image conversion table.

In step S110, a check is made to see whether or not the reception side can use the interleave format designated on the transmission side. When such a format cannot be used, the processing routine advances to step S111. When it can be used, step S112 follows. Namely, a default interleave format is set into the image conversion table in step S111.

In step S112, a check is made to see whether or not the reception side can use the designated sub-sampling ratio. When the designated sub-sampling ratio cannot be used, step S113 follows. When it can be used, step S114 follows. Namely, a default sub-sampling ratio is set into the image conversion table in step S113.

In step S114, in the case where it is designated such that the reception side downloads the same table as the quantization table used on the transmission side and uses it, if the reception side cannot use such a table, the processing routine advances to step S115. If such a table can be used, step S116 follows. In step S115, a default quantization table is set into the image conversion table.

In step S116, in the case where it is designated such that the reception side downloads the Huffman table used on the transmission side and uses it, if the reception side cannot use such a Huffman table, the processing routine advances to step S117. If it can be used, step S118 follows. Namely, in step S117, a default Huffman table is set in the image conversion table.

In step S118, a check is made to see whether or not the reception side can use the designated resolution. When the resolution cannot be used, the processing routine advances to step S119. If it can be used, step S120 follows. In step S119, a resolution whose level is lower than the designated resolution by one level among the resolutions held on the reception side is set into the image conversion table.

In step S120, a check is made to see whether or not the reception side can use the designated color space. When the reception side cannot use the designated resolution, the processing routine advances to step S121. When it can be used, step S122 follows. Namely, in step S121, a color space which the reception side has or a default color space is set into the image conversion table.

In step S122, the image conversion is executed in accordance with the image conversion table set in steps S108 to S121 mentioned above. Namely, the document data stored in the hard disk 11 is decoded by almost the same procedure as that in case of decoding the reception document.

A method of the image converting process in step S122 in the embodiment is described below.

When the image conversion is performed, as a Huffman table that is used in the Huffman decode unit 14 shown in FIG. 1 and a quantization table which is used in the inverse quantization unit 15, the same Huffman table and quantization table as those used upon storage are used. After that, the (8×8) frequency components which were DCT converted upon storage are converted to the (8×8) pixel block data by the IDCT unit 16. The interpolation processing unit 17 executes an interpolating process for the sub-sampling executed upon storage.

Further, after the YUV/RGB conversion unit 18 is YUV/RGB converted, the process in the pixel density conversion unit 19 is not executed but the process in the pixel density conversion unit 3 is performed. The paper size and resolution are converted in accordance with an image conversion table shown in FIG. 8.

Figure 8:
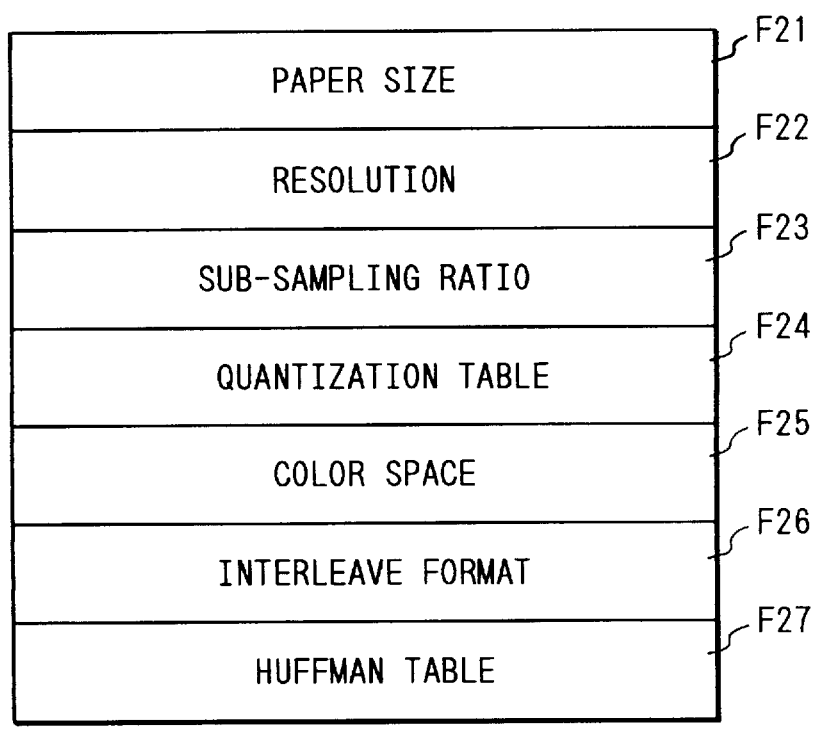
FIG. 8 is a diagram showing an image conversion table which is set in the embodiment.

After the color space conversion is performed by the RGB/YUV conversion unit 4, a sub-sampling according to the image conversion table shown in FIG. 8 is executed by the sub-sampling unit 5. After the DCT conversion is performed by the DCT unit 6, the data is quantized by the quantization unit 7 by using the quantization table of the image conversion table shown in FIG. 8.

Finally, the data is encoded by the Huffman encode unit 8 by using the Huffman table in the image conversion table shown in FIG. 8. The encoded data is stored in the hard disk 11.

On the other hand, in step S123 in FIG. 7, a document profile to be actually sent, namely, in the case where the image conversion is performed, the parameter set in the conversion table or, in the case where a default document profile is used, its parameter is sent to the SUD in a command of document start (hereinafter, abbreviated to CDS), namely, a command indicative of the start of the document and the start of the first page on the reception side.

In steps S124 and S125, the document data is transferred by a plurality of commands of document user information (hereinafter, abbreviated to CDUI). In step S126, a command of document end (hereinafter, abbreviated to CDE) is used to indicate the end of document, further, a final check point.

In step S127, a positive confirmation for the final check point is given to a response of document end positive (hereinafter, abbreviated to RDEP). In step S128, a command of session end (hereinafter, abbreviated to CSE) is used to normally finish the session.

Further in step S129, a fact that a terminal to be called normally finished the session is shown to a terminal on the transmission side by a response of session end positive (hereinafter, abbreviated to RSEP). In step S130, a transport layer and the following are disconnected and the transmission is finished.

FIG. 8 shows the image conversion table set in steps S109 to S121 shown in FIGS. 6A and 6B. A parameter of the paper size is set in F21. A parameter of the resolution is set in F22. A parameter selected from the sub-sampling ratios is set in F23. The table number selected from the quantization table F4 shown in FIG. 3 and a type indicating whether it is a default or not are set in F24, respectively.

Values of parameters allocated to the color spaces YUV, RGB, and La*b*, respectively, are set in F25. Parameter values allocated respectively to the block-sequence and area-sequence of the interleave formats held in the facsimile apparatus according to the embodiment are set in F26. A type of Huffman table and a type indicating whether it is a default or not are set in F27, respectively.

According to the embodiment described above, the transmission document is stored on the transmission side by using the resolution, sub-sampling ratio, and quantization parameter at which the image is stored at a preset high picture quality and which the facsimile apparatus on the transmission side has. The image conversion of the stored document is performed in accordance with the comparison result of those parameters and the parameters which the facsimile apparatus on the reception side has and the converted image is transmitted. Thus, even in the case where the reception side doesn't have the characteristics of the document stored on the transmission side and performs the image conversion and transmits the converted image, an image deterioration by the image conversion is minimized.

The same parameters as those in the image selection table that is set in step S2 are also used as read parameters upon storage in step S3 in the embodiment.

In such a case, when the document characteristics designated in step S106 in FIG. 5 are included on the reception side, the image data stored in the hard disk 11 is transmitted as it is. Therefore, since a a problem of decoding the stored image data and again storing it are eliminated, the image is smoothly transmitted.

<Modification>

A modification of the above embodiment will now be described hereinbelow.

Figure 9:
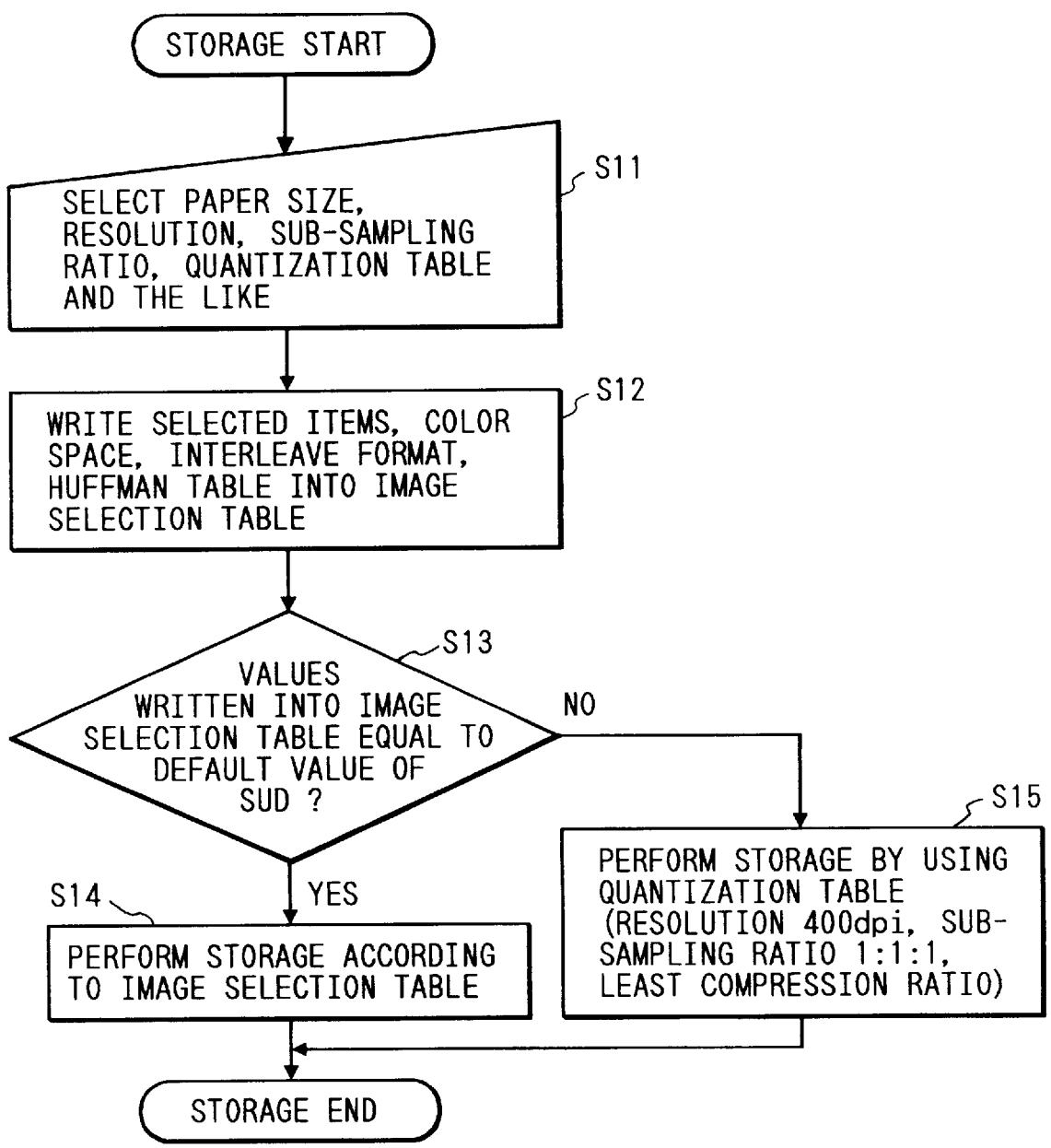
FIG. 9 is a flowchart showing a sequence when a transmission document is stored in the facsimile apparatus according to a modification.

FIG. 9 is a flowchart showing a sequence upon storage of a transmission document in the facsimile apparatus according to a modification of the above embodiment. In step S11 in FIG. 9, a paper size, a resolution, a sub-sampling ratio, a quantization table, and the like are selected by a console unit of the facsimile apparatus. In step S12, the items selected in step S11, and further, a color space, an interleave format, and a Huffman table which are specifically specified in the system are written in the image selection table in FIG. 3 in a manner similar to the above embodiment.

In step S13, a default value of document characteristics to be transmitted and received in the session user data (SUD) and the value written in the above image selection table are compared. When they are equal, a document storage is executed in accordance with the parameters written in the image selection table in step S14.

In step S13, however, when it is judged that the default value of the SUD and the value in the image selection table differ, the document is stored by using the parameters at which the image data are stored at a preset high picture quality by the facsimile apparatus of the modification, namely, by using the quantization table of the resolution of 400 dpi, sub-sampling ratio of 1:1:1 and the lowest compression ratio.

A transmission sequence of the storing document in the facsimile apparatus according to the modification is described below.

Figure 10:
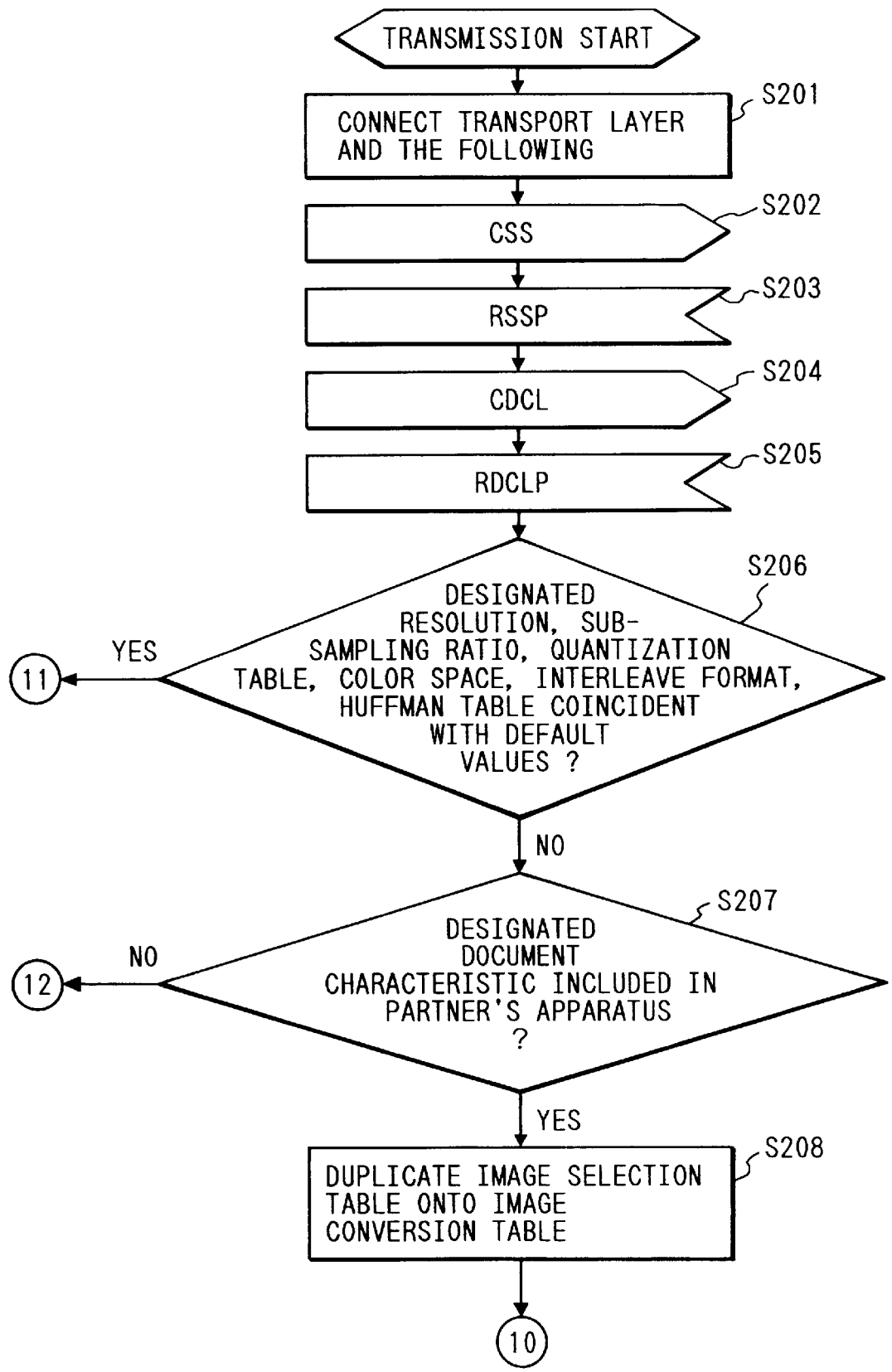
FIG. 10 is a flowchart showing a transmission sequence of a storing document in the facsimile apparatus according to the modification.
Figure 11B:
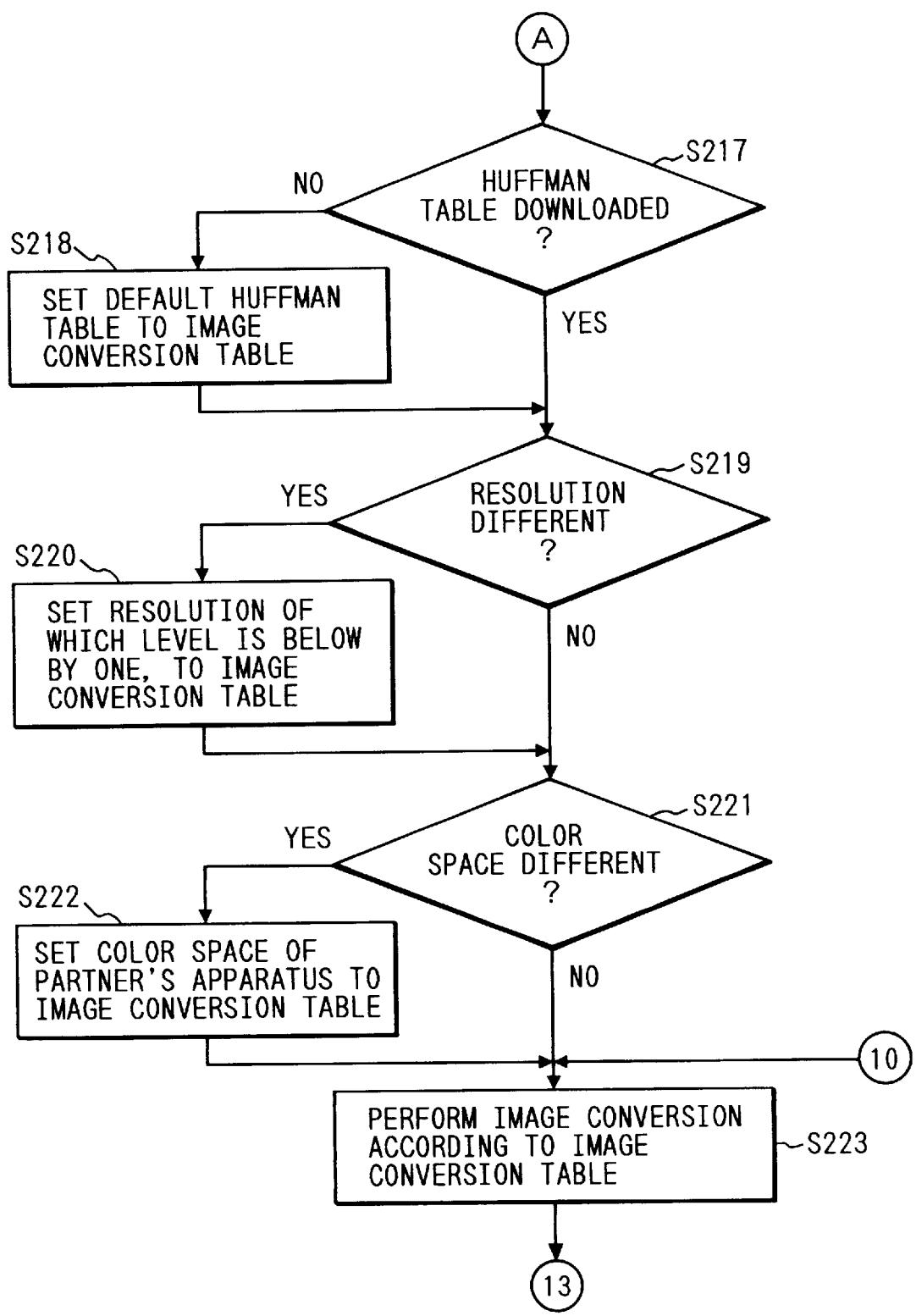
FIG. 11 is comprised of FIG. 11A and FIG. 11B showing flowcharts illustrating a transmission sequence of a storing document in the facsimile apparatus according to the modification.
Figure 12:
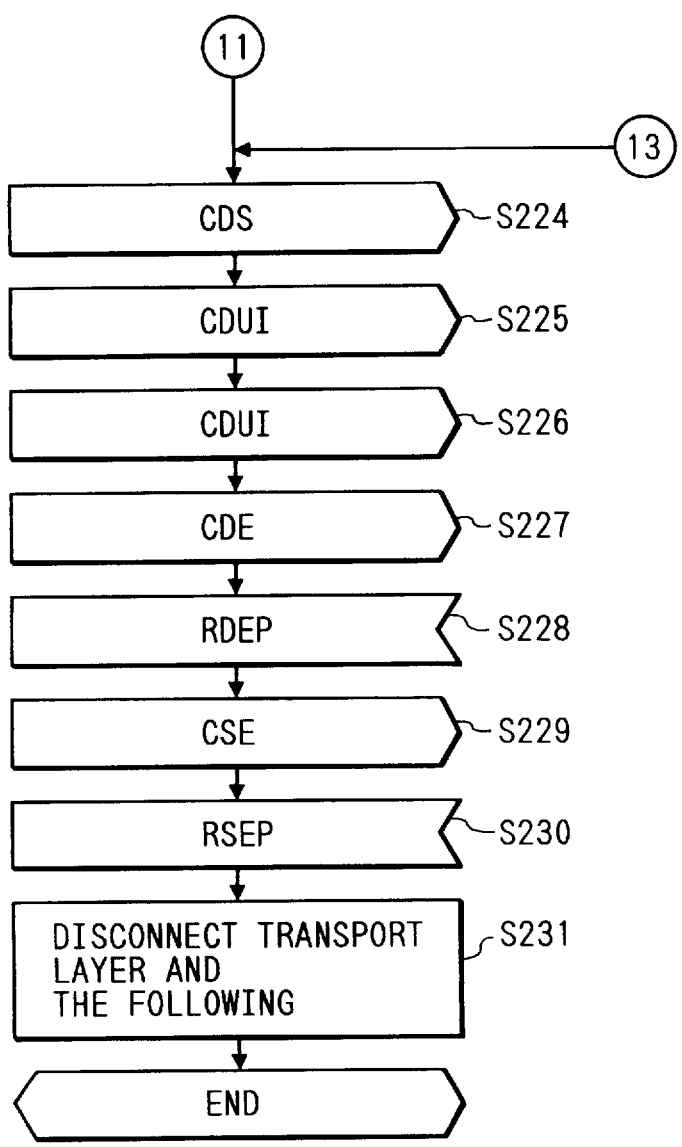
FIG. 12 is a flowchart showing a transmission sequence of a storing document in the facsimile apparatus according to the modification.

FIGS. 10 to 12 are flowcharts showing the transmission sequence of the storing document in the facsimile apparatus according to the modification.

In steps S201 to S205 in FIG. 10, processes similar to those in steps S101 to S105 according to the embodiment shown in FIG. 5, namely, a negotiation with a partner side by a communication is executed.

In step S206, a check is made to see whether or not the resolution, sub-sampling ratio, quantization table, color space, interleave format, and Huffman table shown by the designated parameters coincide with the default values of the document file which are defined in the ITU-T. When they coincide, those parameters are stored as is and processes in step S224 and subsequent steps shown in FIG. 12 are executed.

However, when both of the parameters don't coincide, in step S207, the AND of the document characteristics in the image selection table and the document characteristics sent from the reception side is calculated in a manner similar to the foregoing embodiment. With respect to all of the document characteristics, when they are "true", the processing routine advances to step S208. When any one of the document characteristics is "false", the processing routine advances to step S209 and subsequent steps shown in FIGS. 11A and 11B.

A processing procedure shown in steps S209 to S223 in FIGS. 11A and 11B in the modification are similar to the processes regarding the above embodiment, namely, the processing procedure shown in steps S108 to S122 in FIGS. 6A and 6B. Processes in steps S224 to S231 shown in FIG. 12 are also similar to the processes regarding the embodiment shown in FIG. 7. Therefore, their descriptions are omitted.

As mentioned above, according to the modification, when the instructed parameters coincide with the default values defined by the ITU-T, the transmission document is stored as is and, after that, the document is transmitted. In the other cases, in the facsimile apparatus, the document is stored by using the parameters at which the image data are stored at the preset high picture quality irrespective of the parameters designated by the operator. The image stored is converted in accordance with parameters which are closest to the parameters instructed on the transmission side among the capabilities which the facsimile apparatus on the reception side has. Thus, the image conversion that is perfectly matched with the capability on the reception side is performed. Thus, the image deterioration in association with the image conversion is minimized.

In the above embodiment and modification, an example of the color facsimile apparatus by the ADCT type of what is called a JPEG has been shown and described. The invention, however, is not limited to such an example but may also be applied to a color facsimile apparatus of a dynamic arithmetic operation encoding type of a JBIG.

In such a case, a color facsimile apparatus having a similar effect may be provided by an almost similar sequence except that encoding methods of them merely differ although no quantization table exists.

The invention may be applied to a system constructed by a plurality of equipment or an apparatus constructed by one equipment. The invention may also be applied to a case where the invention is accomplished by supplying a program to a system or an apparatus.

As described above, according to the invention, even in the case where the reception side doesn't have the characteristics of the document stored on the transmission side but performs the image conversion and transmits the converted image data, the image deterioration due to the image conversion is minimized.

Even in the case where the reception side doesn't have the characteristics of the document stored on the transmission side, the reception side performs the image conversion that is perfectly matched with the ability on the reception side and transmits the converted image data, so that the image deterioration due to the image conversion is minimized.

The invention is not limited to the foregoing embodiments but many modifications and variations are possible within the spirit and scope of the appended claims of the invention.

What is claimed is:

1. A color image processing apparatus which communicates color image information, comprising:
   storing means for storing encoded color image information obtained by performing encoding on the basis of a predetermined sub-sampling ratio between a luminance component and a chromaticity component;
   processing means for performing an image process on the encoded color image information stored by said storing means, in accordance with a function of the sub-sampling ratio between the luminance component and the chromaticity component, such function being determined at a reception side; and
   transmitting means for transmitting the color image information processed by said processing means.

2. An apparatus according to claim 1, wherein said processing means converts the picture quality of the color image information.

3. An apparatus according to claim 1, wherein the parameter is based on information received from the reception side to which the color image information is transmitted.

4. An apparatus according to claim 1, wherein the encoding by said encoding means includes irreversible encoding.

5. A color image processing apparatus which communicates color image information, comprising:
   encoding means for performing encoding on the basis of a predetermined quantization table;
   processing means for performing an image process on encoded color image information by said encoding means, in accordance with the quantization table being determined at a reception side; and
   transmitting means for transmitting the color image information processed by said processing means.

6. An apparatus according to claim 5, wherein said processing means converts the picture quality of the color image information.

7. An apparatus according to claim 5, wherein the parameter is based on information received from the reception side to which the color image information is transmitted.

8. An apparatus according to claim 5, wherein the encoding by said encoding means includes irreversible encoding.

9. A color image processing method which communicates color image information, comprising:
   a storing step of storing encoded color image information obtained by performing encoding on the basis of a predetermined sub-sampling ratio between a luminance component and a chromaticity component;
   a processing step of performing an image process on the encoded color image information stored in said storing step, in accordance with a function of the sub-sampling ratio between the luminance component and the chromaticity component, such function being determined at a reception side; and
   a transmitting step of transmitting the color image information processed in said processing step.

10. A method according to claim 9, wherein the picture quality is converted in the image process of the stored color image information.

11. A method according to claim 9, wherein the color image information to be stored is information which is irreversibly encoded.

12. A method according to claim 9, wherein the parameter is based on information received from the reception side to which the color image information is transmitted.

13. A color image processing method which communicates color image information, comprising:
   an encoding step of performing encoding on the basis of a predetermined quantization table;
   a processing step of performing an image process on encoded color image information obtained in said encoding step, in accordance with the quantization table being determined at a reception side; and
   a transmitting step of transmitting the color image information processed in said processing step.

14. A method according to claim 13, wherein the picture quality is converted in the image process of the stored color image information.

15. A method according to claim 13, wherein the color image information to be stored is information which is irreversibly encoded.

16. A method according to claim 13, wherein the parameter is based on information received from the reception side to which the color image information is transmitted.

17. An image processing apparatus comprising:
   transforming means for performing an orthogonal transformation of image information;
   quantizing means for quantizing the orthogonal-transformed image information by a first quantization parameter;
   converting means for converting the image information quantized by said quantizing means to image information which is quantized by a second quantization parameter different from the first quantization parameter,s in accordance with a function determined at a reception side; and
   transmitting means for transmitting the image information converted by said converting means, to the reception side.

18. An apparatus according to claim 17, wherein a parameter of a lowest compression ratio is used as said first quantization parameter.

19. An apparatus according to claim 17, wherein said image information is color image information.

20. An apparatus according to claim 17, wherein said quantization parameter is a quantization table.

21. An image processing method comprising:

a transforming step of performing an orthogonal transformation of image information;

a quantizing step of quantizing the orthogonal-transformed image information by a first quantization parameter;

a converting step of converting the image information quantized by said quantizing step to image information which is quantized by a second quantization parameter different from the first quantization parameter, in accordance with a function determined at a reception side; and a transmitting step of transmitting the image information converted by said converting step, to the reception side.

22. A method according to claim 21, wherein a parameter of a lowest compression ratio is used as said first quantization parameter.

23. A method according to claim 21, wherein said image information is color image information.

* * * * *

UNITED STATES PATENT AND TRADEMARK OFFICE
CERTIFICATE OF CORRECTION

PATENT NO. : 5,847,847

DATED : December 8, 1998

INVENTOR(S): MASAHIKO KOSAKA

Page 1 of 2

It is certified that error appears in the above-identified patent and that said Letters Patent is hereby corrected as shown below:

ON THE TITLE PAGE

[73] Under Assignee: "Cabib Kabushiki Kaisha" should read --Canon Kabushiki Kaisha--.

[56] References Cited:

"4181862" should read --4-181862--;
      "4307893" should read --4-307893--.

IN THE DRAWINGS

Sheet 5 of 13   "REGAL" should read --LEGAL--; and
   Sheet 11 of 13  "REGAL" should read --LEGAL--.

Column 1 line 18,  "doesn't" should read --does not--;
   line 26,  "doesn't" should read --does not--; and
   line 54,  "doesn't" should read --does not--.

Column 7 line 51,  "it" should be deleted and "a a" should read --a--; and

UNITED STATES PATENT AND TRADEMARK OFFICE
CERTIFICATE OF CORRECTION

PATENT NO. : 5,847,847

DATED : December 8, 1998

INVENTOR(S) : MASAHIKO KOSAKA

It is certified that error appears in the above-identified patent and that said Letters Patent is hereby corrected as shown below:

COLUMN 7 line 55, "will now be" should read --is--.

COLUMN 8 line 33, "don't" should read --do not--.

Signed and Sealed this

Second Day of November, 1999

Attest:

Q. TODD DICKINSON

*Attesting Officer*  *Acting Commissioner of Patents and Trademarks*